United States Patent [19]

Dupuy

[11] Patent Number: 5,711,003
[45] Date of Patent: Jan. 20, 1998

[54] METHOD FOR DETERMINING TIMING ADVANCE DURING HANDOVER

[75] Inventor: Pierre Dupuy, Paris, France

[73] Assignee: Alcatel Mobile Communication France, Paris, France

[21] Appl. No.: 545,869

[22] PCT Filed: May 11, 1994

[86] PCT No.: PCT/FR94/00561

§ 371 Date: Nov. 13, 1995

§ 102(e) Date: Nov. 13, 1995

[87] PCT Pub. No.: WO94/27383

PCT Pub. Date: Nov. 24, 1994

[30] Foreign Application Priority Data

May 14, 1993 [FR] France .................. 93 05833

[51] Int. Cl.$^6$ .................. H04B 7/26; H04J 3/16
[52] U.S. Cl. .................. 455/436; 455/502; 370/331
[58] Field of Search .................. 455/33.2, 51.1, 455/54.1, 56.1, 33.1, 33.4, 34.1, 436, 502, 517, 524; 379/60; 370/95.3, 100.1, 103, 331, 337, 350

[56] References Cited

U.S. PATENT DOCUMENTS 5,128,925  7/1992  Dornstetter et al. .................. 455/51.1
5,309,439  5/1994  Roos .................. 370/95.3
5,345,448  9/1994  Keskitalo .................. 455/33.2
5,355,515  10/1994  Sicher .................. 455/33.2

FOREIGN PATENT DOCUMENTS

0398773A1  11/1990  European Pat. Off. .
WO9222966  12/1992  WIPO .

OTHER PUBLICATIONS

R. Mouly et al, "The Pseudo–Synchronisation, a Costless Feature to Obtain the Gains of a Synchronised Cellular Network", Mobile Radio Conference, Oct. 1991, Nice (France) pp. 51-55.

*Primary Examiner*—Reinhard J. Eisenzopf
*Assistant Examiner*—Lester G. Kincaid
*Attorney, Agent, or Firm*—Sughrue, Mion, Zinn, Macpeak & Seas, PLLC

[57] ABSTRACT

A method of handover between two cells of a TDMA cellular mobile radio network, wherein, after a mobile receives a handover command (HANDOVER CMD) from its base station, the mobile transmits a message (SABM) containing connection set-up information or wanted data to a new base station according to a timing advance. The handover command tells the mobile not to transmit access bursts to the new base station, thus avoiding speech interruption. The timing advance is determined by the mobile or communicated to the mobile in the handover command.

19 Claims, 5 Drawing Sheets

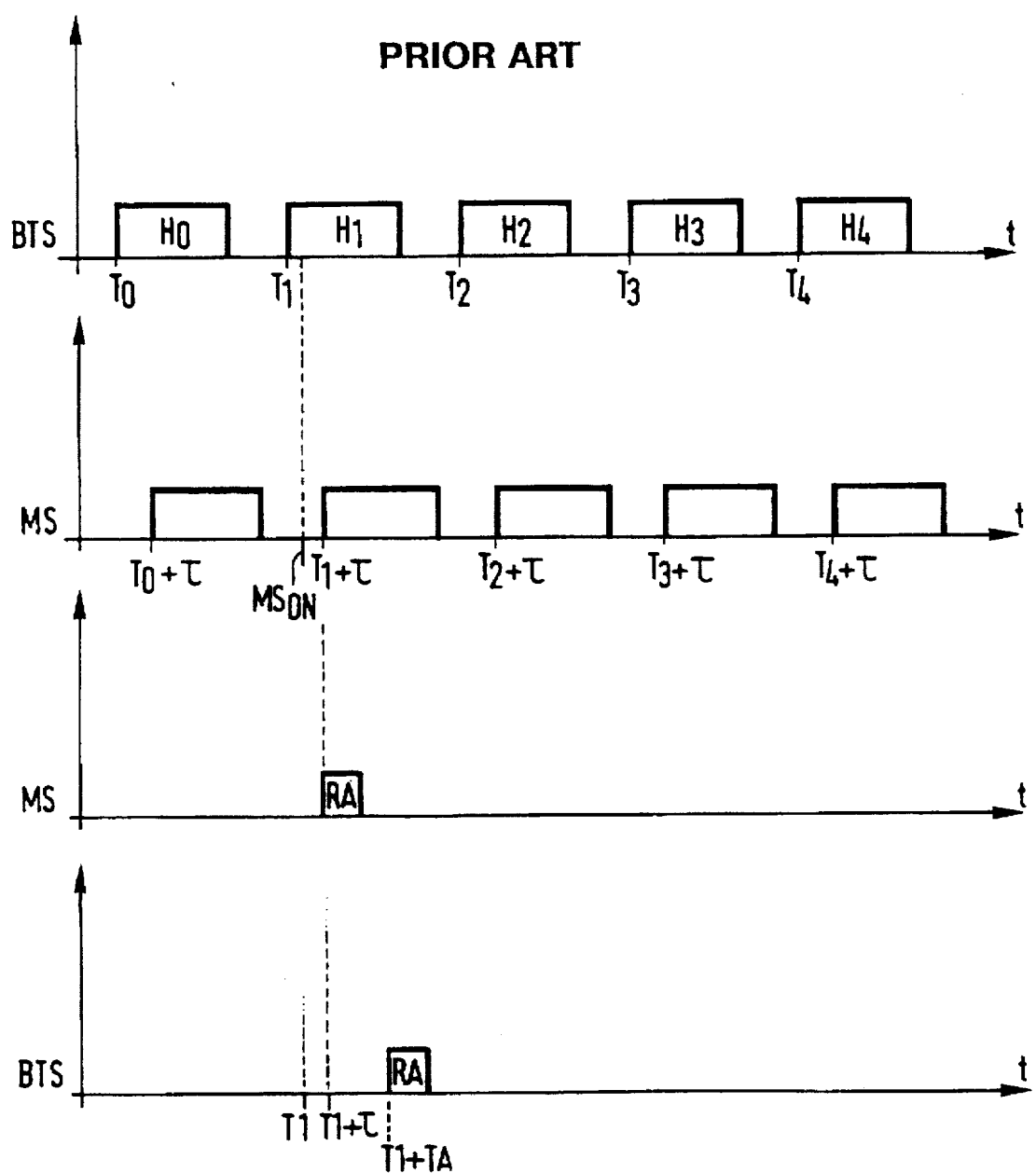

METHOD FOR DETERMINING TIMING ADVANCE DURING HANDOVER

BACKGROUND OF THE INVENTION

The present invention concerns a method of intercellular transfer between two cells of a cellular mobile radio network such as a GSM (Global System for Mobile communications) network. When a mobile station moves from one cell to another neighboring cell of a mobile radio network, each cell having a base transceiver station, the continuity of the call in progress may need to be preserved, and the frequency used for exchanging speech data (or signalling data) between a mobile station (hereinafter called a "mobile") and a base transceiver station changes on moving from one cell to another neighboring cell. A method used to achieve this continuity is known as "handover" in the GSM system.

The following description uses the terminology of the GSM system. For more information, reference may be made to the proceedings of the "Digital Cellular Mobile Communication Seminar" held in Nice from 16 through 18 Oct. 1990.

FIG. 1 is a diagrammatic representation of part of the structure of a GSM network made up of a plurality of cells, of which only three cells C1, C2 and C3 are shown. A mobile MS (for example a mobile telephone in a vehicle) moves around within the coverage area of the GSM network.

A cell of a GSM network corresponds in practise to the geographical coverage of a base transceiver station with which it is associated and which is therefore located at its center. Each base transceiver station comprises one or more transceivers, each associated with an antenna and processing equipment. As shown in FIG. 1, the geographical coverages of the stations partially overlap.

The cells C1, C2 and C3 are associated with respective base transceiver stations BTS1, BTS2 and BTS3. The latter are controlled by a base station controller BSC. The functions of the BSC include frequency management and management of the channels available on the various frequencies at each base transceiver station. The combination of a BSC and the associated base transceiver stations is called a base station system (BSS). There can be a plurality of BSC, each controlling a predetermined number of base transceiver stations. Each BSC is connected to a mobile services switching center (MSC), which constitutes the master structure of a GSM network. Thus a given MSC can control the operation of several BSS constituting a public land mobile network (PLMN).

A network of this kind operates in the following manner: the mobile MS sends signals in the form of streams of digital data or packets called bursts to the station BTS1 while it is in cell C1 and the station BTS1 transmits information extracted from these bursts to the BSC which in turn transmits the information to its destination via the MSC. The destination can be a fixed station or another mobile.

Each burst of data, for example speech data, is transmitted in a time slot of 577 μs duration, eight successive time slots constituting one frame. Eight mobiles MS can therefore communicate on the same radio channel, i.e. on the same carrier frequency, because the GSM network uses the time division multiple access (TDMA) principle. Between two and four radio channels are usually assigned to each base transceiver station and between 16 and 32 time slots or channels are therefore available for transmission in each cell. The same goes for reception.

Because the TDMA principle is used, it is vital in the GSM system to ensure that the time slots assigned to each mobile MS in a given cell are in a given order. A mobile MS and its base transceiver station BTS each have their own internal clock. It is therefore necessary to allow for the time shift due to the propagation time of radio waves between the mobile MS and its base station BTS to prevent the mobile MS transmitting data during the time slot (i.e. on the channel) assigned to another mobile MS (the duration of a time slot is 577 μs and a radio wave travels 300 m in 1 μs).

When the mobile MS is in cell C1 it receives signals not only from the base transceiver station BTS1 but also from BTS2 and BTS3. The GSM system provides this facility to enable the mobile MS to obtain information concerning synchronization, to measure quality (for example the bit error rate) continuously and to measure the level of the signals received from the base transceiver station of the cell C1 in which it is located and from all the base transceiver stations of the neighboring cells C2 and C3. These measurements are effected in the downlink direction (base transceiver station to mobile).

The mobile MS transmits these measurements to BTS1 in the form of a measurement report on a Slow Associated Control Channel (SACCH). If the quality of transmission between MS and BTS1 falls below that of transmission between MS and BTS2, or if the level of signals received from BTS2 becomes greater than that of signals received from BTS1, for example, the BSC issues a handover command to transfer the mobile MS to cell C2 and consequently to base transceiver station BTS2: the handover then takes place and the base transceiver station BTS2 takes over from BTS1. This is the typical situation, in particular when the mobile MS is moving away from BTS1 and towards BTS2.

When handover is effected it is therefore necessary to synchronize the mobile MS to the station BTS2 of the new cell C2 (in what follows, "old" refers to the cell C1 in which the mobile MS was registered before handover and "new" refers to the cell C2 in which the mobile is registered after handover).

Likewise, when the mobile MS is switched on, it must be registered in a cell and synchronized to its base transceiver station in order to transmit signals in the time slot assigned to it.

FIG. 2 is a timing diagram showing the correlation of the signals transmitted by the station BTS1 and by the mobile MS and shows how the appropriate timing advance is transmitted to the mobile MS when the latter is switched on and must be registered in the cell C1, for example.

To this end, the station BTS1 managing the cell in which the mobile MS is located sends a clock signal $H_0$, $H_1$, $H_2$, $H_3$, $H_4$ at regularly spaced times $T_0$, $T_1$, $T_2$, $T_3$ and $T_4$ on a Synchronization CHannel (SCH) which is part of a Broadcast Common CHannel (BCCH) used to transmit synchronization information to mobiles. This clock signal is used when the mobile MS must be registered in a cell of the GSM network; this occurs when the mobile connects to the network for the first time after being switched on and in the event of handover, as explained below.

The mobile MS connects to the network for the first time after it is switched on and can receive the clock signal only from a time $MS_{ON}$ at which it is switched on.

Since the mobile MS is not usually co-located with the base transceiver station BTS1, the first clock signal that it receives after time $MS_{ON}$, the signal $H_1$ in this example, is offset by a time τ relative to the time $T_1$ at which it was transmitted by the base transceiver station BTS1. The mobile therefore receives at time $T_1+τ$ the signal $H_1$ transmitted at time $T_1$.

At this time (or after a predetermined time starting at this time and known to BTS1), the mobile MS requiring to connect to the station BTS1 for the first time after being switched on sends the latter a Random Access (RA) message comprising an Access Burst (in the case of handover, the access burst is called the Handover Access (HA) burst). This burst is transmitted on a signalling channel. Each Access Burst has a duration less than that of a "normal" burst constituting a normal signal, which contains speech data, for example; this is so that it cannot interfere with signals transmitted by another mobile in the next time slot.

On receiving this signal (at time $T_1$+TA) the station BTS1 can determine the Timing Advance (TA) separating this reception of the clock signal $H_1$ from its transmission. This time TA corresponds to twice the time to transmit a signal between the mobile MS and the station BTS1, i.e. twice the time τ. The station BTS1 then sends the mobile MS a message on an Access Grant CHannel (AGCH) to tell the mobile that it must transmit messages with a timing advance TA relative to its clock signal: the mobile can then transmit normal signals without risk of them overlapping with those transmitted by other mobiles. This ensures that the signals transmitted by the various mobiles on a given transmission channel arrive at the station BTS1 in succession.

As the distance between the mobile MS and the station BTS1 can vary, the synchronization of the mobile MS must be corrected frequently. After the initial determination of the timing advance, the latter is corrected so that the mobile MS is kept synchronized to the station BTS1 as it moves around in cell C1.

If the mobile MS is registered in the cell C2 following a handover command from the BSC, there are four types of handover and these differ in terms of the method employed to synchronize the mobile MS to the base transceiver station BTS2 of the new cell C2: synchronous handover, asynchronous handover, pseudo-synchronous handover and pre-synchronized handover.

The principle of synchronous handover is shown in FIG. 3. It entails controlling the clocks of a certain number of BTS of a given GSM system so that they are synchronous. Thus when the mobile MS moves from the cell C1 to the cell C2, these two cells being covered by synchronous BTS, there is no need to supply it a new timing advance, since the latter is immediately deduced from that it was using previously in the cell C1 and the time shift between the base transceiver stations BTS1 and BTS2, which is known to the mobile MS.

The synchronous handover procedure requires eight successive transmission steps.

In step 1 the mobile MS sends to the station BTS1 a measurement report (MEAS REP) containing the results of measurements to be used by the BSC to initiate handover if they show that the quality of transmission between the mobile MS and BTS1 is worse than that of transmission between the mobile MS and BTS2, or that the level at which signals are received from BTS1 is lower than that at which signals are received from BTS2. The mobile MS sends this message to the station BTS1 two times a second.

In step 2 the station BTS1 transmits the information contained in the message MEAS REP to the BSC in a message MEAS RES. The BSC can then determine if handover is needed. As already mentioned, the decision criteria include the quality and the level of the received signals. Other types of information are available at the MSC or the BSC to determine if handover is needed. It is assumed hereinafter that this is so.

In step 3 the BSC activates a channel of the station BTS2 (message CHAN ACT) and the latter sends an acknowledgement (message CHAN ACT ACK).

In step 4 the BSC sends a handover command (message HANDOVER CMD), i.e. a command to change base transceiver station, to the station BTS1 which immediately retransmits it to the mobile MS transparently.

In step 5 the mobile MS sends successive HANDOVER ACCESS (HA bursts to the station BTS2. It usually sends four such bursts. Each HA burst has a duration of about 5 ms and so the time needed to transmit the four HA bursts is at least 20 ms. The HA bursts are transmitted on a data traffic channel, for example a speech data channel, which means that the time to transmit the HA bursts is taken from the time available for transmitting speech, and that the speech signal is interrupted for this purpose, which is naturally totally undesirable.

The HA bursts can also be used to adjust the gain at the BTS receiver. If the level of the first HA burst received by the BTS is too high, so that the BTS2 receiver is saturated, the gain of the BTS receiver is reduced and the operation is repeated several times (usually four times) using the various HA bursts transmitted until a signal is received at an appropriate level.

Also, a random number for identifying the mobile MS is assigned to the latter in the HANDOVER CMD message. This identifier must be used by the mobile MS when it transmits the HA bursts so that if another mobile uses the channel reserved for the mobile MS for which the handover has been effected, BTS2 will not recognize in the HA burst of this "intruder" mobile the identifier assigned in the HANDOVER CMD message. This avoids the risk of two mobiles using the same channel.

In synchronous handover, the BTS also uses the HA bursts to determine the exact value of the new timing advance TA2 that the mobile MS has deduced from the old timing advance TA1.

This information is very important since BTS2 needs it in order to tell the mobile MS at a later stage the corrections required to its timing advance due to changes in its position. When handover is completed, the mobile MS regularly (usually two times per second) advises BTS2 of the timing advance used, via the uplink SACCH, so that the BTS can update this data continuously to track movement of the mobile. Corrections to the timing advance are therefore transmitted regularly from BTS2 to the mobile MS over the downlink SACCH.

When it has correctly received one of the HA bursts, the station BTS2 sends a HANDOVER DETECTION message to the BSC controller (step 5) to tell it that the expected mobile is correctly synchronized.

In step 6, immediately after sending four HANDOVER ACCESS bursts, the mobile MS sends a connection message SABM to the station BTS2. This message determines the logical connection between the mobile MS and the station BTS2 such that all messages exchange subsequently are exchanged in an "acknowledged" mode.

From this time onwards the mobile MS dialogs with the base station BTS2 that has assigned it a time slot in a frame conveyed by a given carrier, together with a timing advance indication TA2. Transmission of wanted speech data, interrupted after sending of the HANDOVER CMD message, can resume prior to transmission of the message SABM by the mobile MS.

The station BTS2 then tells the mobile MS (by means of a message UA) that it has understood and that further communications are in the "acknowledged" mode, and advises the BSC of this (message ESTABLISH INDICATION); the BSC can then switch the communication line assigned to communications between the mobile MS and the station BTS2.

The ESTABLISH INDICATION message can also be sent after one of the HA bursts (immediately after the first HA burst, for example).

In step 7 the mobile MS sends a HANDOVER COMPLETE message to the station BTS2 to advise it that the handover procedure has been completed and the station BTS2 immediately forwards this message to the BSC. The BSC then advises the mobile services switching centre MSC (message HO. PERF.).

In step 8 the BSC sends an RF CHAN REL message to the station BTS1 to tell it to release the timeslot (channel) previously assigned to the mobile MS. The station BTS1 sends back an acknowledgement (message RF CHAN REL ACK).

One drawback of synchronous handover is the time for which speech is interrupted by the sending of the HA bursts. This is a particular problem in urban areas where cells are small and the mobile may cross several cells during the course of one and the same conversation.

Also, synchronous handover is a costly procedure.

Asynchronous handover is the form of handover most widely used and the simplest to implement. In this case the base transceiver station of the cells between which handover is effected are not synchronized.

FIG. 4 shows the principle of asynchronous handover.

Steps 1 through 4 are identical to those previously described with reference to FIG. 3 concerning synchronous handover.

In step 5 the mobile MS sends successive HA bursts to BTS2 with a null timing advance, i.e. as if it were co-located with the station BTS2. The new timing advance that the mobile MS is to use is unknown to the mobile at this time and is communicated to it by the station BTS2 (in a message PHYS INFO the contents of which include the TA2 indication), after the latter has determined it in the manner described with reference to FIG. 2.

Steps 6 through 8 are also identical to those of the synchronous handover procedure.

The main drawback of asynchronous handover is that it takes a relatively long time for the base transceiver station BTS2 to determine the timing advance; it takes about 40 ms to 80 ms, during which time the mobile cannot transmit wanted data, for example speech data. Moreover, the transmission of each HA burst takes 5 ms, as already mentioned. Other delays contribute to delaying handover and the call is frequently cut off for more than 100 ms so that, in terms of speech interruption time, asynchronous handover imposes a greater penalty than synchronous handover.

Thus both asynchronous handover and synchronous handover make the system uncomfortable to use.

Pseudo-synchronous handover is a more complex process that is usually employed when the base transceiver stations BTS1 and BTS2 are plesio-synchronous, i.e. when their clocks (timebases) do not have the same date, but have exactly the same second duration (pseudo-synchronous handover is described, for example in the article "The pseudo-synchronisation, a costless feature to obtain the gains of a synchronised cellular network", MRC 1991 committee, November 1991 and in document EP-A-0 398 773).

Accordingly, the real time delay (RTD) between the timebases of two plesio-synchronous BTS is constant, and it is sufficient to measure it once only.

This evaluation is effected during a training phase by a mobile effecting an asynchronous handover between the two BTS concerned, in the manner described with reference to FIGS. 2 and 4. Immediately after the asynchronous handover, the mobile MS knows the values of TA1, TA2 and the observed time delay (OTD) between the two base transceiver stations, the latter being different from the real time delay RTD. The OTD value is known to the mobile since the latter receives signals continuously both from the cell C1 in which it is located and from neighboring cells such as the cell C2. It is therefore possible to determine the value of RTD when using asynchronous handover from the formula: RTD=OTD+TA1−TA2.

The real time delay determined in this way is transmitted to the BTS concerned and is therefore known to them. The other mobiles can then effect pseudo-synchronous handovers allowing for this real time delay and deducing the new timing advance TA2 to be used in the base station BTS2 directly from the old timing advance TA1 corresponding to the base transceiver station BTS1 and the observed time delay OTD between BTS1 and BTS2.

It is equally possible to effect a pseudo-synchronous handover between BTS that are not plesio-synchronous. In this case, the value of RTD is regularly corrected on each new handover between BTS1 and BTS2 by having the mobile send the value OTD+TA1 to BTS2 at the end of each handover, in the HANDOVER COMPLETE message.

In practise the pseudo-synchronous handover principle is similar to that of synchronous handover, in part because synchronous handover is a special case of pseudo-synchronous handover with a real time delay RTD equal to zero.

Pseudo-synchronous handover therefore has the same drawbacks as synchronous handover in terms of interrupting the call in order to transmit HA bursts.

The final type of handover is pre-synchronized handover, described in document WO 92/22966, for example, in which a predetermined timing advance is transmitted by the BSC to the mobile MS in the HANDOVER CMD message. In this method also the transmission of the HA bursts interrupts the call, which is undesirable.

The problem of speech interruption due to the transmission of HA bursts is specific to handover and is not encountered when the mobile is registered for the first time in a cell after it is switched on, since in this case the call has not yet been set up when the mobile sends the RANDOM ACCESS messages.

SUMMARY OF THE INVENTION

The aim of the invention is to provide a handover method avoiding interruption of speech due to the transmission of HA bursts in the synchronous, pseudo-synchronous and pre-synchronized handover processes.

This object, and others that emerge below, is achieved by a method for handover between two cells of a cellular mobile radio network, each of said cells having a base transceiver station, wherein a mobile communicating with a first of said base transceiver stations, called the old base transceiver station:

receives a handover command, transmits a message containing connection set up information or wanted data to said new base transceiver station, allowing a timing advance, called the new timing advance, with which it must delay transmission of its messages to said second base transceiver station, called the new base transceiver station, said method being characterized in that said handover command further tells said mobile not to transmit access bursts to said new base transceiver station and in that said new timing advance is determined by said mobile if it is not communicated to it in said handover command.

The invention reduces the time for which speech is interrupted to transmit the HA bursts.

In a first embodiment of the present invention if the old and new base transceiver stations are synchronous and are not both on the same site, the new timing advance is determined by the mobile from the last value of the timing advance, called the old timing advance, with which the mobile was delaying the transmission of its messages to the old base transceiver station, and from the time delay observed by the mobile between the old and new base transceiver stations.

The new base transceiver station then determines the new timing advance used by the mobile from the difference between the old timing advance and the observed time delay, this value being transmitted to the new base transceiver station by the mobile in a message that the latter sends to the former after transmitting the message containing connection set up information or wanted data to the new base transceiver station, to tell it that handover has been completed.

Another possibility is for the base transceiver station to be informed of the timing advance used by the mobile by means of a measurement report regularly sent to the new base transceiver station by the mobile. While waiting for the first measurement report after the handover command, the new base transceiver station sends the mobile a message telling it that it must retain the current value of the new timing advance to delay transmission of its messages to the new base transceiver station.

In a second embodiment of the present invention, the old and new base transceiver stations are synchronized and are both on the same site; in this case the new timing advance is identical to the last value of the timing advance, called the old timing advance, with which the mobile was delaying transmission of its messages to the old base transceiver station.

The new base transceiver station is then informed of the new timing advance by its base station controller. It can also be informed of it or determine it in the same way as when the two base transceiver stations are not on the same site.

In a third embodiment of the present invention the old and new base transceiver stations are plesio-synchronous; in this case the new timing advance is deduced from the last value of the timing advance, called the old timing advance, with which the mobile was delaying transmission of its messages to the old base transceiver station, from the time delay observed by the mobile and from the real time delay between the old and new base transceiver stations, which is known to the old base transceiver station and the new one.

The new base transceiver station can then determine the new timing advance itself. In this case, it additionally makes use of the real time delay, which is known to it.

Another possibility is for the new base transceiver station to be informed of the new timing advance in the same way as when the base transceiver stations are synchronized and are not on the same site.

Finally, in a final embodiment of the present invention, the old and new base transceiver stations are asynchronous and handover is pre-synchronized; in this case, the message containing the handover command also contains the new timing advance.

In this case the new timing advance can be communicated to the new base transceiver station by means of the handover command.

Another possibility is for the new base transceiver station to be informed of the new timing advance used by the mobile by means of a measurement report sent regularly by the mobile to the new base transceiver station. While waiting for the first measurement report or one of the first measurement reports following the handover command, the new base transceiver station sends to the mobile a message telling it that it must retain the old timing advance to delay transmission of its messages to the new base transceiver station.

A base station controller, a base transceiver station and a mobile suitable for implementation of the method of the invention are described in relation to claims 13 through 17.

BRIEF DESCRIPTION OF THE DRAWINGS

Other features and advantages of the invention will emerge from a reading of the following description of one preferred embodiment of the invention given by way of illustrative and non-limiting example only and from the appended drawings in which:

FIG. 2 is a timing diagram showing the correlation between signals exchanged between a base transceiver station and a mobile.

In FIGS. 1 to 5, common items carry the same reference symbols.

DETAILED DESCRIPTION OF THE PREFERRED EMBODIMENTS

FIGS. 1 through 4 have been described already with reference to the prior art.

Figure 1:
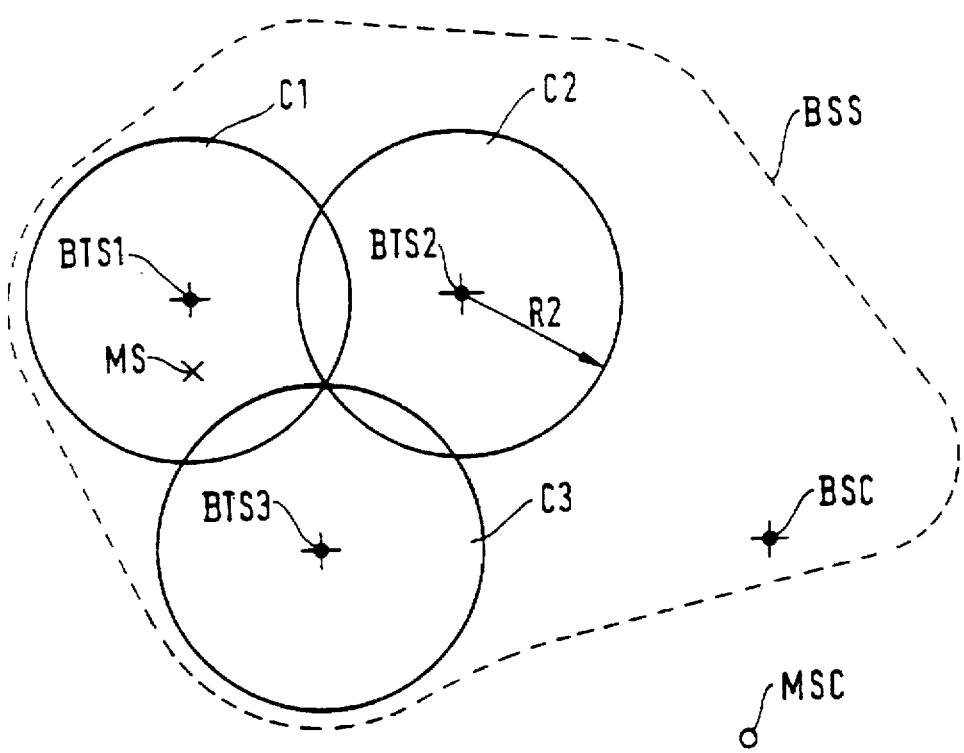
FIG. 1 is a diagram showing part of the structure of GSM type network.
Figure 5:
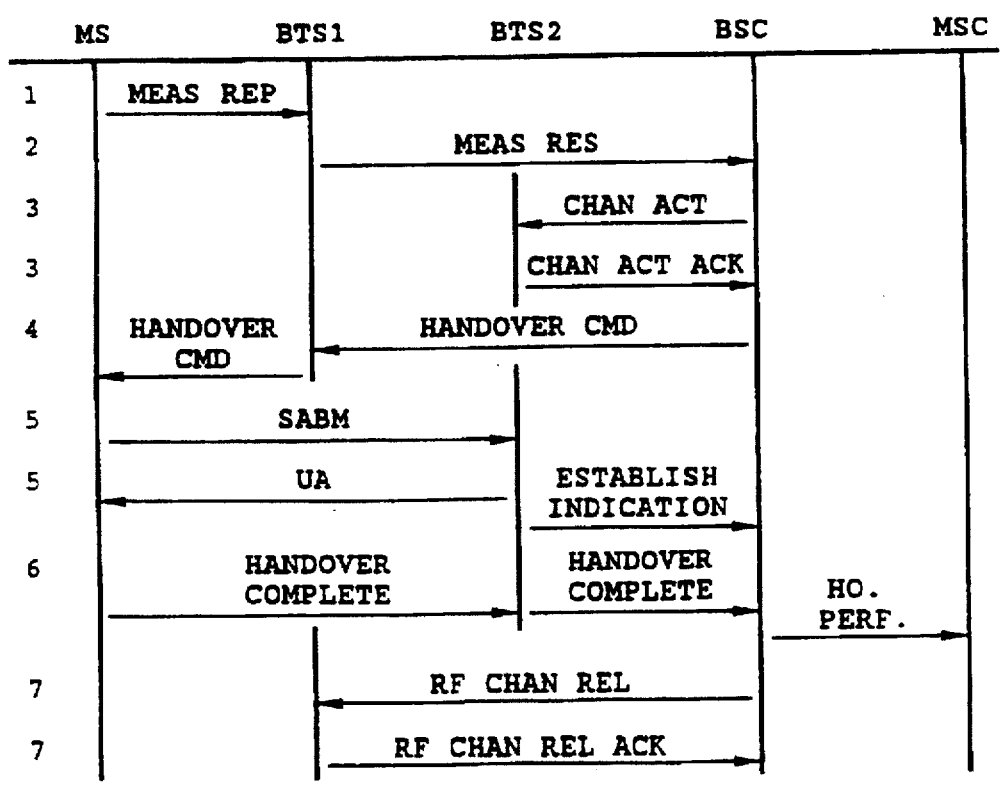
FIG. 5 shows a synchronous handover procedure of the invention.

FIG. 5 shows a synchronous handover procedure of the invention. This handover is called "internal" in the sense that the base transceiver stations of the cell in which the mobile is initially located and of that in which it must be registered after handover are controlled by the same BSC.

Figure 3:
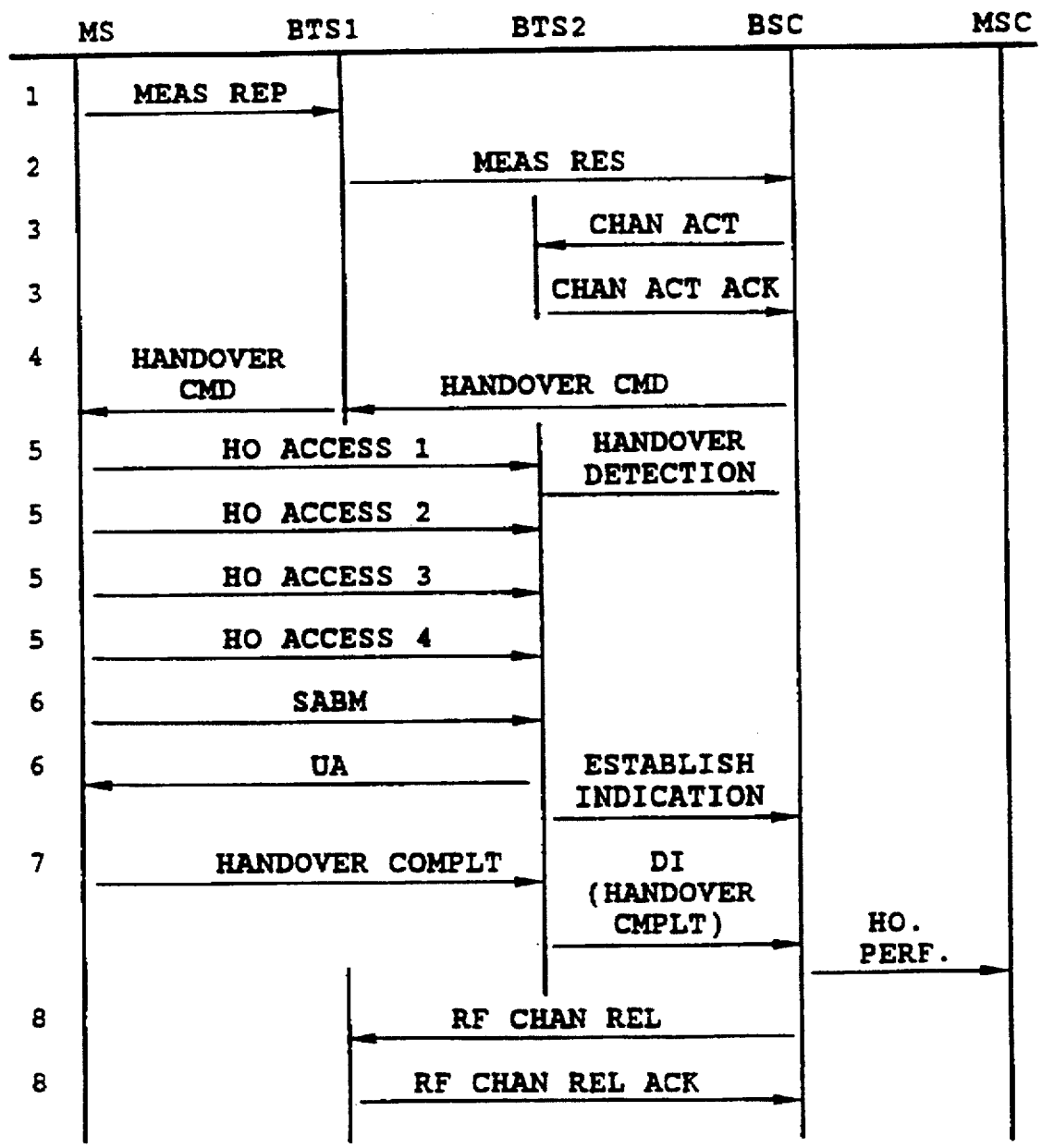
FIG. 3 shows a prior art synchronous handover procedure.
Figure 4:
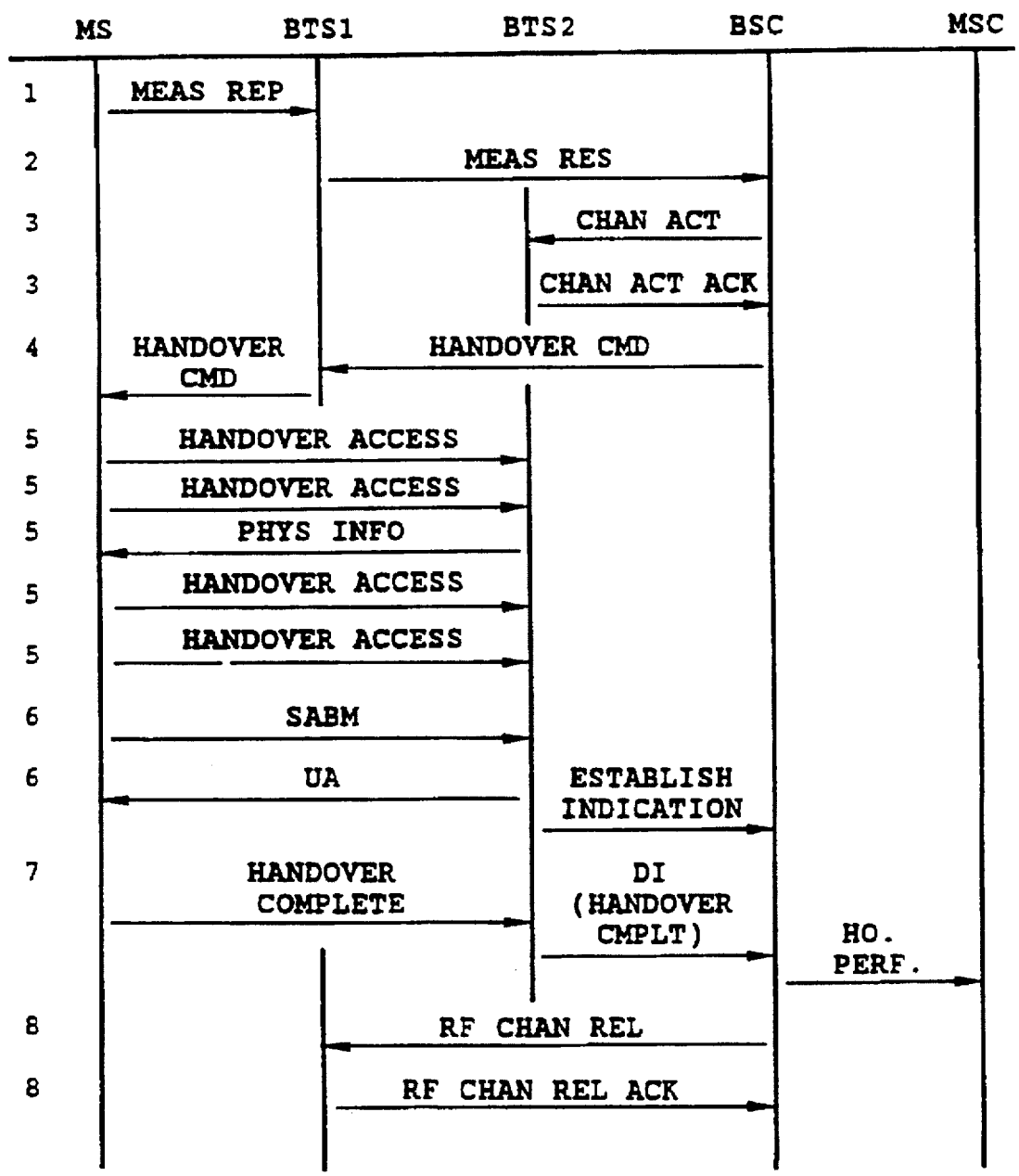
FIG. 4 shows a prior art asynchronous handover procedure.

In the synchronous handover procedure of the invention, steps 1 through 4 are identical to those described with reference to FIG. 3, and they will not be described again in detail here.

Unlike the prior art synchronous handover procedure, in the synchronous handover procedure of the invention no HA bursts are transmitted. Step 5 from FIG. 3 is therefore eliminated and, after sending the HANDOVER CMD message to the mobile MS, the station BTS2 waits to receive the message SABM directly or to receive wanted data (e.g. speech) directly.

Eliminating the transmission of the HA bursts is in no way prejudicial to correct execution of the handover procedure, as will now be explained.

In the case of synchronous handover, the HANDOVER ACCESS bursts are not in practise used in determining the new timing advance TA2 to be used by the mobile in the new cell C2 (that covered by the base transceiver station BTS2), since the latter can deduce this information for itself directly from the last value of the timing advance TA1 used in the old cell C1 (that covered by the base transceiver station BTS1), given that the base transceiver stations BTS1 and BTS2 of these two cells are supposedly synchronous.

To determine TA2, the mobile therefore uses the last value of TA1, which it knows, and the value of the time delay observed by it (OTD), relative to the base transceiver stations BTS1 and BTS2. Given that, in synchronous handover, RTD=0, the mobile deduces TA2 directly from the formula: TA2=TA1+OTD.

Using the HANDOVER ACCESS bursts to set the gain of the transmitter of the mobile can be replaced by other, equivalent methods of adjusting the gain well known to the person skilled in the art, for example by doubling the input signal at the receiver of BTS2 or a fast gain setting method.

Furthermore, using the HANDOVER ACCESS bursts to verify that the mobile transmitting them is that which received the handover command (HANDOVER CMD) is not necessary in practise since the probability of another mobile using the channel allocated to the mobile concerned during handover is very low.

The problem is then for BTS2 to determine the timing advance TA2 actually used by the mobile MS after the handover, since there are no more HANDOVER ACCESS bursts to enable this to be measured and, after handover and before the mobile sends the first subsequent measurement report, only the mobile knows TA2.

There are two feasible solutions to the problem, in accordance with the invention, depending on whether BTS1 and BTS2 are on the same site or not.

Two BTS can be on the same site if a sectorized cell is used, i.e. a cell made up of a plurality of sectors forming radial portions of the disk defined by the coverage area of the sectorized cell, each of these sectors being associated with one BTS, and all the BTS associated with the sectors being at the centre of the sectorized cell and therefore at the same site.

Two BTS can also be on the same site if concentric cells are used, i.e. if transmission over different distances uses different frequencies.

Thus when the base transceiver stations BTS1 and BTS2 are on the same site, the mobile MS moving from one sector to another does not change the timing advance that it has to use, and this timing advance is known to BTS1. It is therefore sufficient for the BSC to advise BTS2 that the new timing advance TA2 is identical to the last value of the old timing advance TA1. It can do this in the CHAN ACT message, for example.

If the base transceiver stations BTS1 and BTS2 are not on the same site (this is the conventional case of handover between two cells that are not sectors of the same sectorized cell or that are not concentric), the base transceiver station BTS2 can deduce the new timing advance TA2 used by the mobile MS using the general formula: TA2=OTD+TA1.

Since the mobile sends the base transceiver station BTS2 the value TA1+OTD in the HANDOVER COMPLETE message, as it knows RTD (which is nil in the case of synchronous handover), the base transceiver station BTS2 can deduce the new timing advance TA2 used by the mobile MS.

If BTS2 is not able to determine the new timing advance used by the mobile MS itself, for example because it has no information telling it what type of handover has been effected, it can wait for the first uplink SACCH from the mobile MS, for example. The MEAS REP message on this SACCH includes the timing advance TA2 actually used by the mobile MS after the handover. While waiting to receive this uplink SACCH, BTS2 tells the mobile MS, in the downlink SACCH that it also usually transmits two times per second, that it must not modify its current timing advance, i.e. that which it initially determined after the handover using the formula: TA2=TA1+OTD.

This information supplied by BTS2 on the SACCH replaces the usual timing advance correction information contained in the latter (see above) and used to advise the mobile MS what correction it must apply to its timing advance.

Steps 5 through 7 of synchronous handover in accordance with the invention are respectively identical to steps 6 through 8 as previously described with reference to FIG. 3.

In pre-synchronized handover in accordance with the invention, the HANDOVER CMD message transmitted to the mobile contains the timing advance that the mobile must use in the new cell C2 in which it is registered. Accordingly, the suppression by the invention of the HANDOVER ACCESS bursts in pre-synchronized handover is no impediment to BTS2 finding out the timing advance used by the mobile, since the BSC can give it this value.

If the BSC does not give it this value, BTS2 can wait until it is supplied on the SACCH from the mobile MS, as previously explained.

The HA bursts are also eliminated in pseudo-synchronous handover in accordance with the invention. The mobile determines TA2 in the same way as in synchronous handover in accordance with the invention, further using for this purpose the RTD value, which can be communicated to it in the HANDOVER CMD message, for example.

To find out the timing advance TA2 used by the mobile MS, as described previously with reference to synchronous handover in accordance with the invention, BTS2 can either determine it itself using the formula: TA2=OTD−RTD+TA1 (remember that RTD is constant for pseudo-synchronous handover with plesio-synchronous BTS), or wait for the first uplink SACCH from the mobile containing this information.

The invention therefore makes it possible to eliminate the HANDOVER ACCESS bursts which in the prior art are sent by the mobile while calls may still be in progress, and does this without prejudice to the remainder of the handover procedure or subsequent communications with mobiles. This reduces the speech interruption time by about 20 ms, which represents a non-negligible advantage.

It is important to note that the invention applies only to synchronous, pseudo-synchronous and pre-synchronized handover (i.e. when the timing advance is predetermined and is communicated to the mobile in the handover command).

The invention is advantageous primarily in heavy call traffic areas in which handovers are numerous because the cells are small: in this situation, the invention prevents repetitive cutting-off of speech during one and the same call.

In heavy traffic areas the load on each BSC is high, with the result that the latter devotes more and more time to controlling handover, so that the handover time is greatly increased. Consequently, the reduction by the invention of the time needed to effect the handover automatically compensates for the increased handover time due to the increase in traffic.

The modification of the handover procedure by the present invention has the great advantage of not requiring any modification to existing BTS hardware. It is sufficient to modify the content of the HANDOVER CMD message sent by the BSC, to tell the mobile in this message that it is not necessary to transmit HANDOVER ACCESS bursts. Accordingly, the modifications in accordance with the invention are merely software modifications, as will emerge below.

Figure 6:
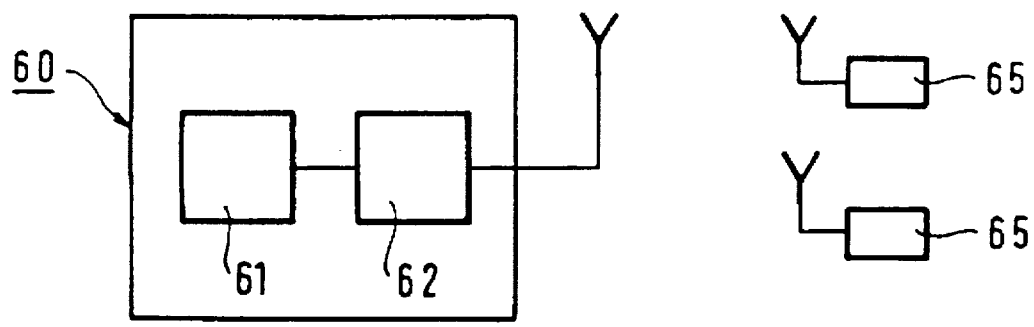
FIG. 6 is a diagram showing a base transceiver station for implementing the method of the invention.

To be more precise, a base transceiver station 60 shown diagrammatically in FIG. 6 comprises:
means 61 for determining the new timing advance,
a control unit 62 for producing and transmitting command messages to mobiles 65.

In accordance with the invention, the control unit 62 is able to produce and transmit to a mobile messages to tell it to retain the new timing advance that it has determined pending reception by the base transceiver station 60 of a measurement report from the mobile advising it of the new timing advance that the mobile is using.

In accordance with the invention, the means 61 use one of the methods previously indicated to determine the new timing advance, if necessary.

In the case of pre-synchronized handover, the control unit 62 additionally allows incorporation into the handover command that it transmits to a mobile of the new value of the timing advance, received from the base station controller.

Figure 7:
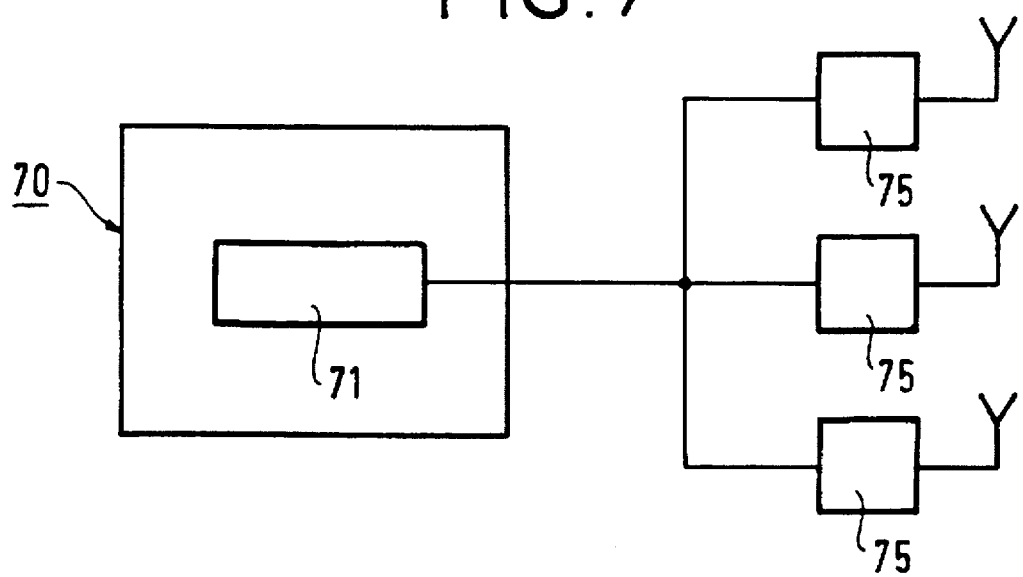
FIG. 7 is a diagram showing a base station controller for implementing the method of the invention.

A base station controller 70, shown diagrammatically in FIG. 7, includes a control unit 71 for a plurality of base transceiver stations 75. The unit 71 produces and transmits command messages to the base transceiver stations 75, including handover commands on the occasion of handover.

In accordance with the invention, the unit 71 is such that these commands advise the mobiles communicating with the base transceiver stations concerned not to send access bursts on the occasion of handover.

In the case of pre-synchronized handover, the unit 71 also produces and transmits messages telling the base transceiver stations the new timing advance to be used.

The control unit 71 also produces and transmits messages telling the base transceiver stations 75 not to determine the new timing advance on the occasion of handover, and to use for the latter the value indicated by the mobile in one of the first measurement reports that it sends.

The control unit can also produce and transmit messages giving the base transceiver stations 75 the value of the new timing advance to be used.

Figure 8:
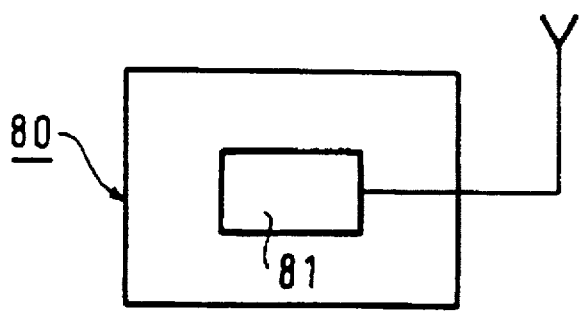
FIG. 8 is a highly schematic representation of a mobile for implementing the method of the invention.

Finally, a mobile 80 shown very diagrammatically in FIG. 8 includes means 81 for determining the new timing advance on the occasion of handover, using one of the methods previously indicated.

The base transceiver station, base station controller and mobile described hereinabove have been described only with reference to their components relevant to implementation of the present invention. They naturally include many other components that are not relevant to implementation of the invention and for this reason have not been described.

If it is necessary to transmit the HANDOVER ACCESS bursts to enable the BTS to adjust the gain, the BSC does not modify the HANDOVER CMD, with the result that everything proceeds as in the prior art.

Thus the invention eliminates the speech interruption time in synchronous, pseudo-synchronous and pre-synchronized handover without penalizing the handover procedure or requiring major equipment modifications.

The time waiting for the first (or one of the first) uplink SACCH from the mobile to find out the timing advance actually used by the latter is negligible in practise, with the result that the deterioration in quality is imperceptible to the human ear.

The invention is obviously not limited to the embodiments just described.

In particular, any method can be used to enable the new BTS to determine the timing advance actually used by the mobile.

Moreover, the procedures described concern internal handover, but the invention applies equally to external handover.

Wherever possible, it is preferable for the new BTS to determine the new timing advance used by the mobile itself and without delay. However, where this is not possible, for example because the new base transceiver station has not been advised of the type of handover effected, the new BTS must wait for the uplink SACCH from the mobile.

Finally, any means as described can be replaced with equivalent means without departing from the scope of the invention.

I claim:

1. A method for handover of a communication link with a mobile from an old base transceiver station of a first cell of a cellular mobile radio network to a new base transceiver station of a second cell of the cellular mobile radio network, the method comprising the steps of receiving at said mobile a handover command;

instructing, in said handover command, said mobile not to transmit access bursts to said new base transceiver station determining, by said mobile, a new timing advance with which said mobile must delay transmission of its messages to said new base transceiver station if said new timing advance is not communicated to said mobile in said handover command; and without transmitting access bursts, transmitting from said mobile a message containing connection set up information or wanted data to said new base transceiver station, said message being transmitted using said new timing advance.

2. Method according to claim 1 wherein, if said old and new base transceiver stations are synchronous and are not both on the same site, said determining step includes determining by said mobile said new timing advance from the last value of the timing advance, called the old timing advance, with which said mobile was delaying the transmission of its messages to said old base transceiver station, and from the time delay observed by said mobile between said old and new base transceiver stations.

3. Method according to claim 2, further comprising the steps of:

informing said new base transceiver station of said new timing advance used by said mobile by means of a measurement report sent regularly by said mobile to said new base transceiver station; and while waiting for the first of said measurement reports after said handover command, sending from said new base transceiver station to said mobile a message telling said mobile that it must retain the current value of said new timing advance to delay the transmission of its messages to said new base transceiver station.

4. Method according to claim 2, wherein said determining step includes determining by said new base transceiver station said new timing advance used by said mobile itself from the value of the difference between said old timing advance and said observed time delay, the method further comprising the step of:

transmitting said value to said new base transceiver station by said mobile in a message that the mobile sends to said new base transceiver station after transmitting said message containing connection set up information or wanted data to the new base transceiver station, thereby informing said new base transceiver station that handover has been completed.

5. Method according to claim 1 wherein, if said old and new base transceiver stations are synchronous and are both on the same site, said determining step includes making said new timing advance identical to the last value of timing advance, called the old timing advance, with which said mobile was delaying the transmission of its messages to said old base transceiver station.

6. Method according to claim 5, further comprising the step of:

informing said new base transceiver station of said new timing advance from its base station controller.

7. Method according to claim 1 wherein, if said old and new base transceiver stations are plesio-synchronous, said determining step includes deducing said new timing advance from the last value of the timing advance, called the old timing advance, with which said mobile was delaying the transmission of its messages to said old base transceiver station and the time delay observed by said mobile and the real time delay known to said old and new base transceiver stations between said old and new base transceiver stations.

8. Method according to claim 7, further comprising the steps of:

advising said new base transceiver station of said new timing advance used by said mobile by means of a measurement report sent regularly by said mobile to said new base transceiver station; and while waiting for the first or one of the first of said measurement reports after said handover command, sending from said new base transceiver station to said mobile a message telling said mobile that it must retain said old timing advance for delaying the transmission of its messages to said new base transceiver station.

9. Method according to claim 7, wherein said determining step includes determining by said new base transceiver station said new timing advance used by the mobile itself from said real time delay and from the value of the difference between said old timing advance and said observed time delay, the method further comprising the step of:

transmitting this value to said new base transceiver station by said mobile in a message that the mobile sends to the new base transceiver station after transmitting said message containing connection set up information or wanted data to the new base transceiver station, to inform the new base transceiver station that handover has been completed.

10. Method according to claim 1 characterized in that, if said old and new base transceiver stations are asynchronous and said hangover is pre-synchronized, the message containing said hangover command further contains said new thing advance.

11. Method according to claim 10 characterized in that said new timing advance is communicated to said new base transceiver station by means of said hangover command.

12. Method according to claim 10, further comprising the steps of:

informing said new base transceiver station of said new timing advance used by said mobile by means of a measurement report sent regularly by said mobile to said new base transceiver station; and while waiting for the first of said measurement report after said handover command sending from said new base transceiver station to said mobile a message telling said mobile that it must retain said old timing advance to delay the transmission of its message to said new base transceiver station.

13. Mobile for implementation of the method according to claim 1 characterized in that it comprises means for determining said new timing advance.

14. Base transceiver station for implementation of the method according to claim 1, comprising means for determining said new timing advance used by the mobile and a control unit for producing and transmitting messages to the mobile on the occasion of hangover, characterized in that said message tell said determined pending reception by said base transceiver station of a measurement report from said mobile giving it said new timing advance.

15. The method according to claim 1, wherein said message is transmitted prior to said new base transceiver station being informed of said new timing advance.

16. Base station controller for implementation of a method for handover of a communication link with a mobile from an old base transceiver station of a first cell of a cellular mobile radio network to a new base transceiver station of a second cell of the cellular mobile radio network, the method comprising the steps of: receiving at said mobile a handover command; instructing, in said handover command, said mobile not to transmit access bursts to said new base transceiver station; determining, by said mobile, a new timing advance with which said mobile must delay transmission of its messages to said new base transceiver station if said new timing advance is not communicated to said mobile in said handover command; and, without transmitting access bursts, transmitting from said mobile a message containing connection set up information or wanted data to said new base transceiver station, said message being transmitted using said new timing advance, the base station controller comprising:

a control unit for a plurality of base transceiver stations for producing and transmitting handover commands on the occasion of handover, said commands instructing the mobiles not to transmit access bursts.

17. Base station controller according to claim 16 characterized in that said handover commands produced by said control unit contain the value of the new timing advance in the case of pre-synchronized handover.

18. Base station controller according to claim 16 characterized in that said control unit further produces and transmits message telling said base transceiver stations not to determine said new timing advance on the occasion of hangover and to use for the latter the value indicted by said mobile in one of the first measurement reports that it sends.

19. Base station controller according to claim 16 characterized in that said control unit further produces and transmits message telling said base transceiver stations the value of said new timing advance.

* * * * *